May 14, 1968     N. B. LUCERO     3,382,592
APPARATUS AND METHOD OF TEACHING HANDWRITING TO CHILDREN
Filed March 18, 1966     2 Sheets-Sheet 1
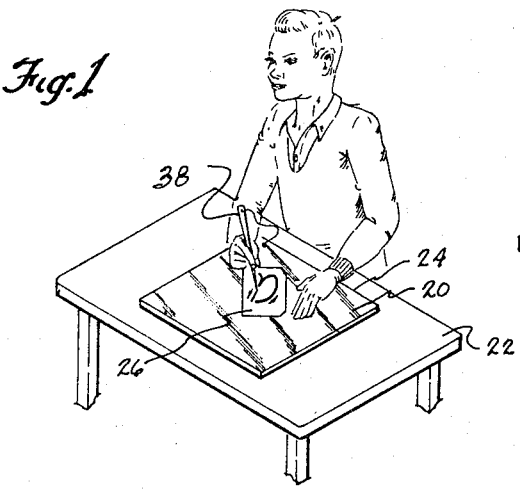
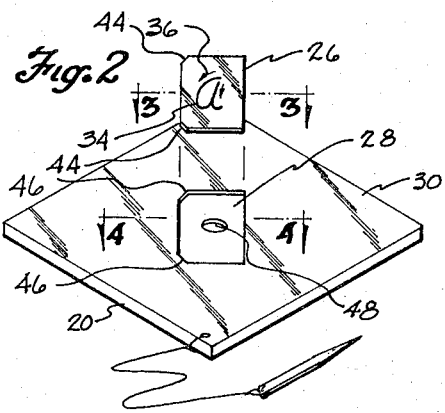
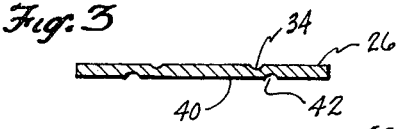
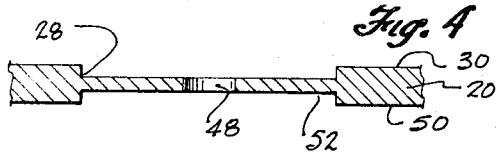
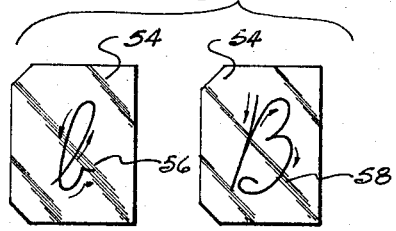
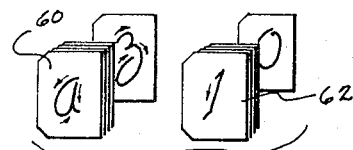
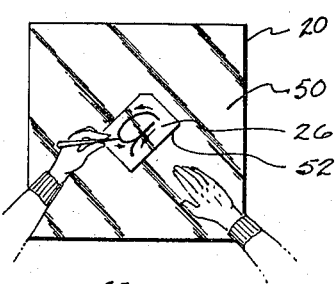
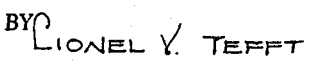
INVENTOR.
NOE' B. LUCERO
BY LIONEL V. TEFFT
ATTORNEY May 14, 1968 N. B. LUCERO 3,382,592
APPARATUS AND METHOD OF TEACHING HANDWRITING TO CHILDREN
Filed March 18, 1966 2 Sheets-Sheet 2
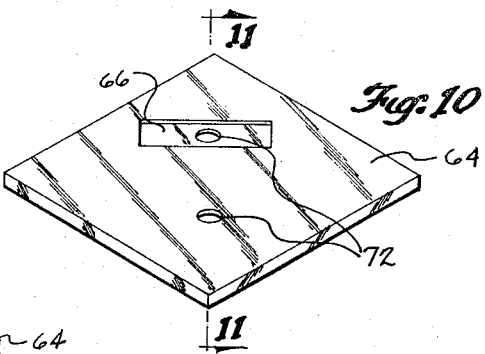
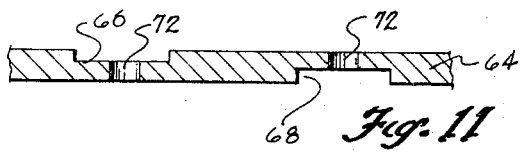
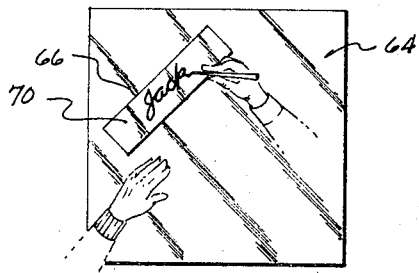
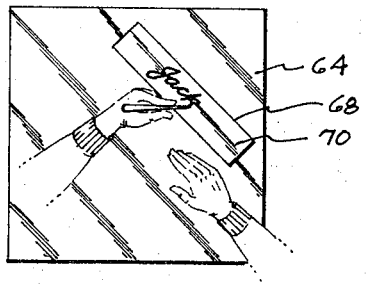
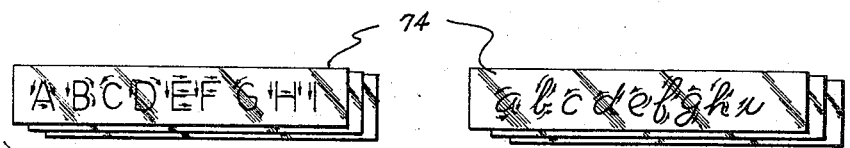
INVENTOR.
NOE B. LUCERO
BY LIONEL V. TEFFT
ATTORNEY

United States Patent Office 3,382,592
Patented May 14, 1968

3,382,592
APPARATUS AND METHOD OF TEACHING
HANDWRITING TO CHILDREN
Noe B. Lucero, 7453 Indiana Ave.,
Riverside, Calif. 92504
Filed Mar. 18, 1966, Ser. No. 541,895
4 Claims. (Cl. 35—37)

ABSTRACT OF THE DISCLOSURE

Apparatus for teaching hand writing to retarded children and others, including a base board shallowed to receive in an angular and reversible manner a groove infixed block with a small letter or numeral of any type on one side and a capital or larger similar character on the reverse side.

---

This invention relates generally to apparatus and methods of teaching handwriting to children.

Many children have great difficulty in mastering the ability to write the alphabet and words formed by a combination of letters, numerals or the like. The invention is not particularly adapted to retarded children but includes all classes of youngsters who have difficulty in acquiring the correct and proper smooth strokes required for a legible and effective hand.

The fundamental theory of the present invention is to methodically instruct children, with or without handicaps, by positioning their arms and guiding their hands and pencil held fingers continuously in grooved correctly formed letters and the like infixed in attractive blocks held in secured position whereby a gradual relaxation of arm and hand muscles will finally induce habitual simulation of the proper handwriting stroke.

A main object of the invention is to provide a device that methodically assists children in making proper handwriting strokes.

Another object of the invention is in the method of teaching children to write by continuous guided hand and pencil grasped finger movement in a groove infixed writing block until the stroke becomes habitual.

A further object of the invention is to provide a device and method for teaching children to write properly in a lessened period of time by controlled continuous guided hand movement that becomes a habit.

These and other objects and advantages of the present invention will become apparent to those skilled in the art upon consideration of the following detailed description of the preferred embodiment thereof, reference being made to the accompanying drawings, herewith, wherein:

FIGURE 1 is a perspective of a child utilizing the device;

FIGURE 2 is a perspective schematic view of the writing pad and reversible groove infixed letter block;

FIGURE 3 is a view taken on the line 3—3 of FIGURE 2;

FIGURE 4 is a view taken on the line 4—4 of FIGURE 2;

FIGURE 5 is a schematic view showing the small and capital grooved letter sides of a single block;

FIGURE 6 is a perspective schematic view showing several letter and numeral groove infixed blocks;

FIGURE 7 is a plan view showing letter block and hand positioning for a right handed child;

FIGURE 8 is a similar plan view for a left handed child;

FIGURE 9 is a perspective view of several name or word groove infixed blocks;

FIGURE 10 is a perspective view of a modified writing pad for name or word blocks;

FIGURE 11 is a view taken on the line 11—11 of FIGURE 10;

FIGURE 12 is a plan view showing proper name or word block position for a right handed child;

FIGURE 13 is a similar plan view for a left handed child; and

FIGURE 14 is a schematic view showing the possibility of variously lettered alphabet blocks.

Before referring specifically to the drawings in which a preferred embodiment of the invention is disclosed, it might be well to state that the groove infixed reversible block embedded writing pad or board might be changed somewhat as long as the fundamental features of the invention are retained.

An examination of the drawings will immediately disclose a special writing pad or board adapted to receive reversibly disposed and securely embedded therein a groove infixed letter or other type of block. The block and board arrangement is such that right or left handed, the child has his arms, hands and fingers always sustained in proper writing stroke position. This is essential so that the child's muscles will gradually relax as the pencil is methodically moved in the continuous groove infixed properly formed letters or the like until the stroke becomes habitual and a test of acquired skill may be made on paper.

The teaching device or apparatus of preferred design includes a writing board or pad 20 that is placed on a table or desk 22 as shown in FIGURE 1. As shown, the inner edge 24 of the pad 20 lies parallel to the edge of the table 22. This is not absolutely essential but it is most important that a block 26 lies securely embedded in a shallow cut-out portion 28 on an upper face 30 of the board or pad 20 so that the arms and hands of the child rest thereon in proper hand writing stroke position. Arm and hand position may be indicated on the board 20 as shown in phantom at 32. The block 26 may be made of any desired kind of material but it is preferred that it be of an attractive color that will contrast with the color of a groove infixed properly formed letter 34 thereon. As shown, the letter 34 is an "a" and adjacent arrow 36 on the face of the block 26 indicates the direction of movement of the child's pencil 38 methodically and repeatedly moved within the groove-infixed letter 34. When the child's arms and hands are in proper writing position as shown in FIGURE 1, he or she will continuously follow the arrow guided letter-grooves 34 until a relaxed stroke is attained and becomes habitual. A lower face 40 of the block or tile 26 has a groove infixed capital letter a 42 similarly formed thereon. Two of the edges 44 of the block 26 are beveled to be secured against similar beveled edges 46 on the shallow bed 28. This insures that the block 26 will always assure proper position, reversed or not for a right handed child, as shown in FIGURE 1. An aperture 48 in the block 20 makes reversement for use as desired relatively easy.

It will be noted that a lower face 50 of the board 20 has a similar beveled edge shallow block receiving bed 52 that is adapted to receive either the same block 26 or another of similar shape. It will be noted that if the board 20 is turned over and the lower block embedded side used, that the board will then be in proper position of use by a left handed child. This can best be understood by viewing FIGURES 7 and 8 of the drawings.

As far as the blocks or tiles 26 are concerned, the letter 34 groove infixed thereon is slanted in proper stroke position. It is obvious that separate blocks 54, FIGURE 5, will have similar groove infixed small b 56 side and large B side 58. Also in FIGURE 6, similar shaped blocks 60 and 62 are groove infixed with other letters and numerals or the like. The depth and size of the groove infixed letters may be varied to suit the capacity of the child receiving methodical instruction. The particular colors used for the blocks and grooves only becomes important as long as they are contrasting and thus made attractive as well as making the continuous exercise much easier. As stated previously, the reversing of the writing board or pad 20 to right or left hand use is shown in FIGURES 7 and 8.

It is desired that a child progresses from single letters or numerals to names or words. In FIGURES 10 and 11, a modified writing board or pad 64 is shallowed on one side at 66 and on the other side at 68 to receive the elongated groove infixed name or word blocks or plates 70. Dual apertures 72 therein insure easy block reversal from one side to the other for use by right and left handed children as shown in FIGURES 12 and 13, respectively. Elongated blocks or plates 74 which are shown in FIGURE 14 disclose a method of teaching the alphabet. As a matter of fact, various kinds of blocks and indicia thereon can be used. It is important that the letters be properly formed and if possible that unnecessary crossing of grooves be avoided to make the child's methodical exercise fairly easy.

The operation of the teaching apparatus and the methodical use required to make proper letter forming and stroke habitual is believed to have been clearly set forth in connection with the description. As stated, the writing boards could be changed to some degree and even the form of the blocks as long as they are secured in proper hand writing position.

While I have shown and described in considerable detail what I believe to be the preferred form of my invention, it will be understood that various changes may be made in the shape and arrangement of the several parts without departing from the broad scope of the invention as defined in the following claims.

I claim:

1. A child's handwriting teaching device, comprising:
    a block having a continuous groove in-fixed letter, numeral or the like; and
    a writing board adapted to have secured therein said block in proper hand writing position, said board having;
    a shallowed portion conforming to the shape of the block and sustaining it in a detachable manner; and
    said shallowed portion having sides which are disposed at an acute angle with respect to the corresponding sides of the board; said angle being the same as the angle made between the arm and hand of a child and an underlying supporting surface when the child is in proper handwriting position.

2. A device as set forth in claim 1 in which said detachable block is reversible in the shallowed portion and has a small letter or the like on one side and a capital letter or the like on the other side.

3. A device as set forth in claim 2 in which said block is beveled on two corners.

4. A device as set forth in claim 2 in which said board has a second shallowed portion on the opposite side from said first shallowed portion to accommodate right or left handed children.

References Cited

UNITED STATES PATENTS

| | | | |
|---|---|---|---|
| 1,216,405 | 2/1917 | Birch | 35—36 |
| 3,189,350 | 6/1965 | Hopkins | 35—31.4 X |

FOREIGN PATENTS

| | | |
|---|---|---|
| 201,616 | 7/1920 | Canada. |
| 670,476 | 9/1963 | Canada. |
| 508,236 | 7/1920 | France. |

EUGENE R. CAPOZIO, *Primary Examiner.*

WILLIAM H. GRIEB, *Examiner.*